Sept. 6, 1932.  A. L. WASHBURNE  1,875,532
BOTTLE CONVEYER AND DELIVERER
Filed Dec. 26, 1930  5 Sheets-Sheet 1
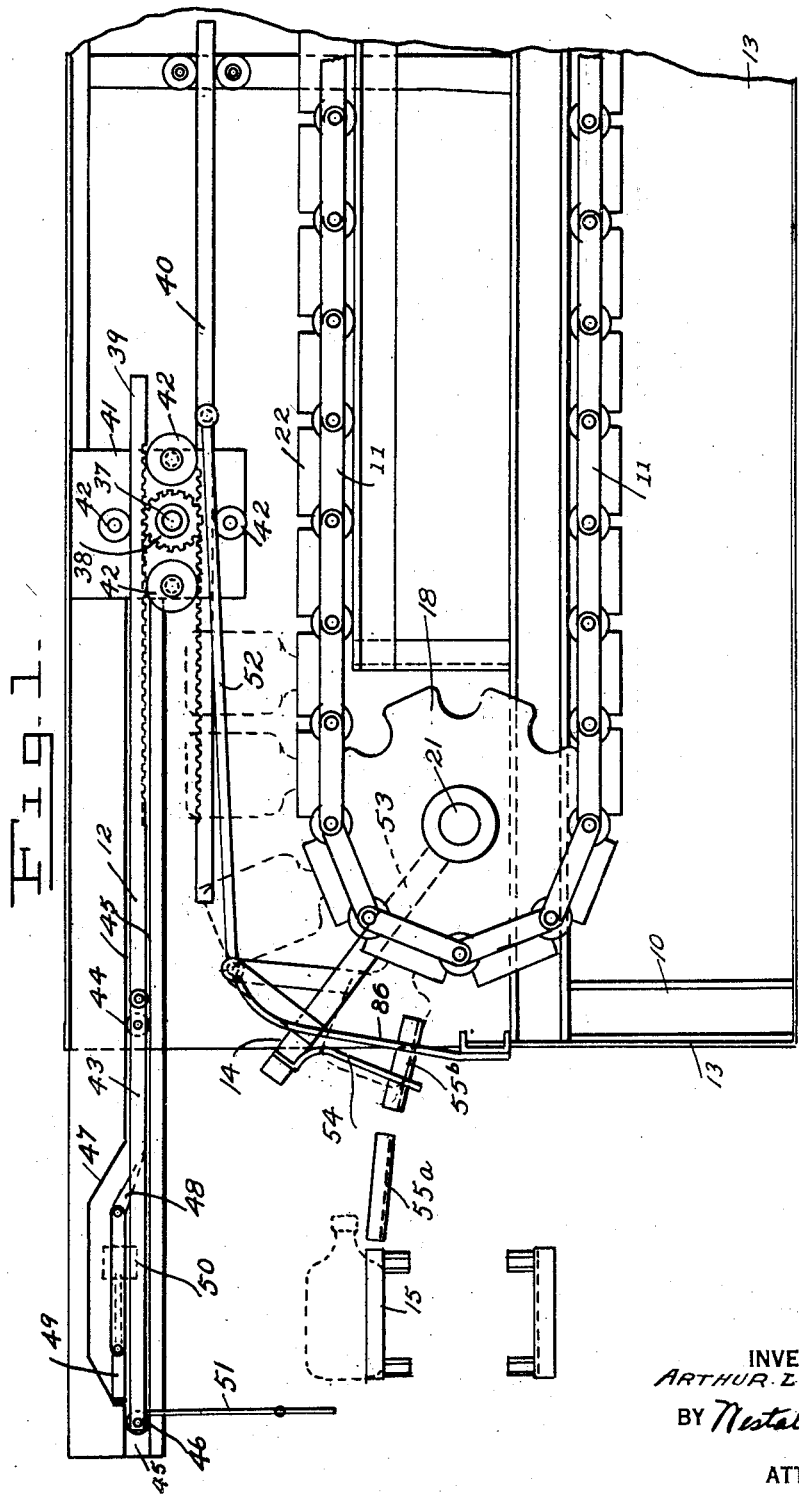
INVENTOR
ARTHUR L. WASHBURNE.
BY Nesttall and Wallace
ATTORNEYS Sept. 6, 1932.　　　A. L. WASHBURNE　　　1,875,532
BOTTLE CONVEYER AND DELIVERER
Filed Dec. 26, 1930　　　5 Sheets-Sheet 2
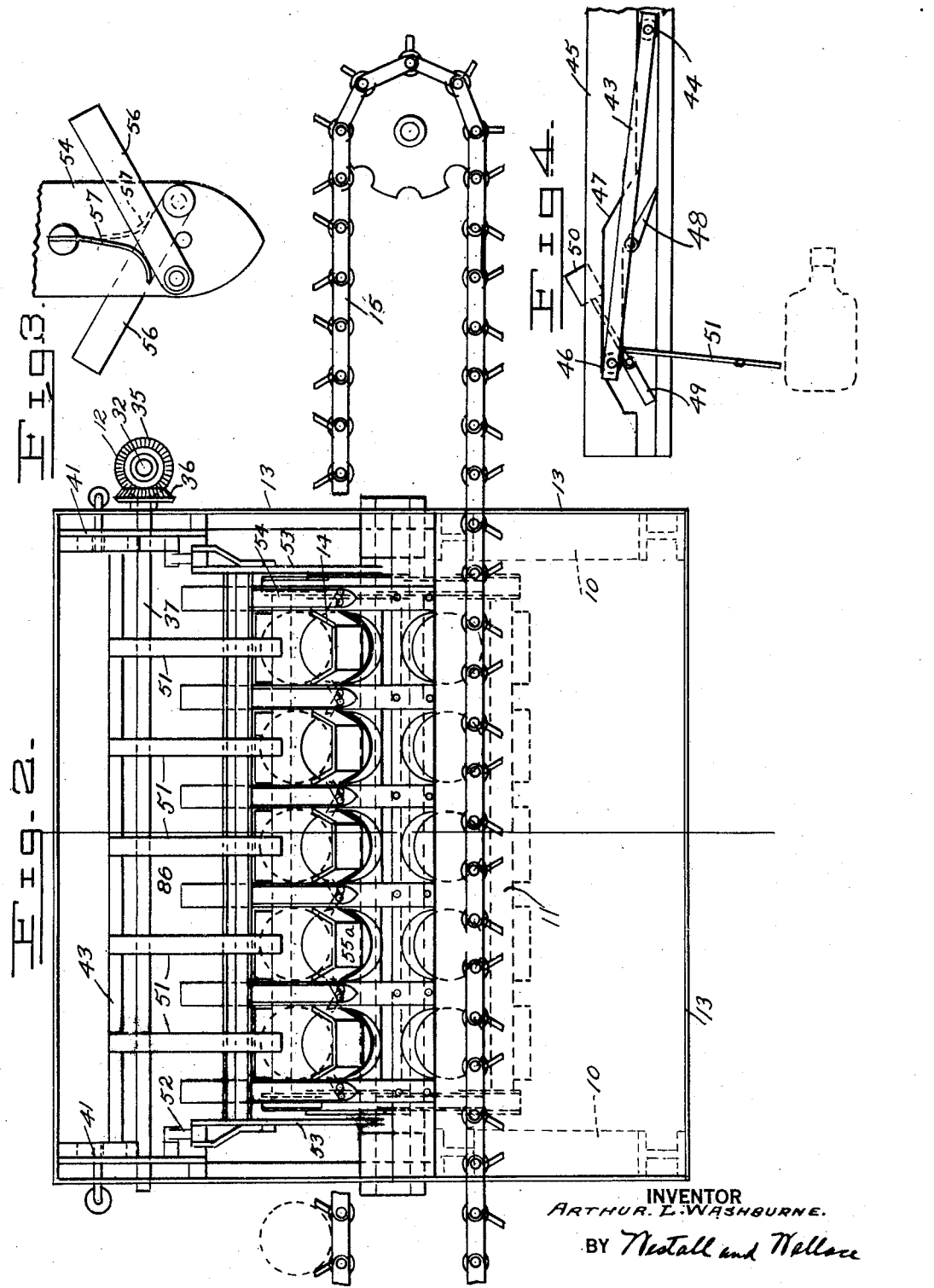

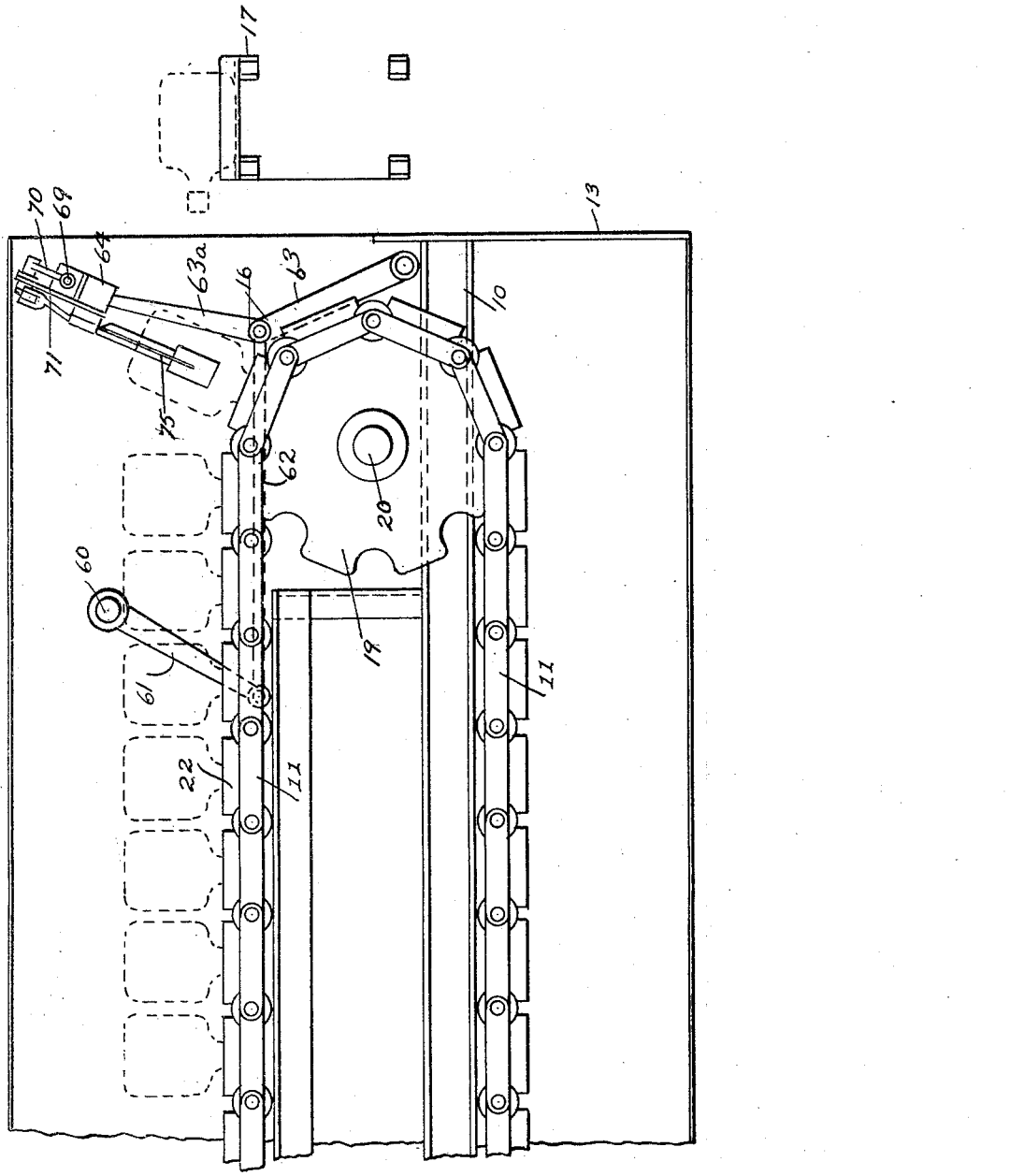

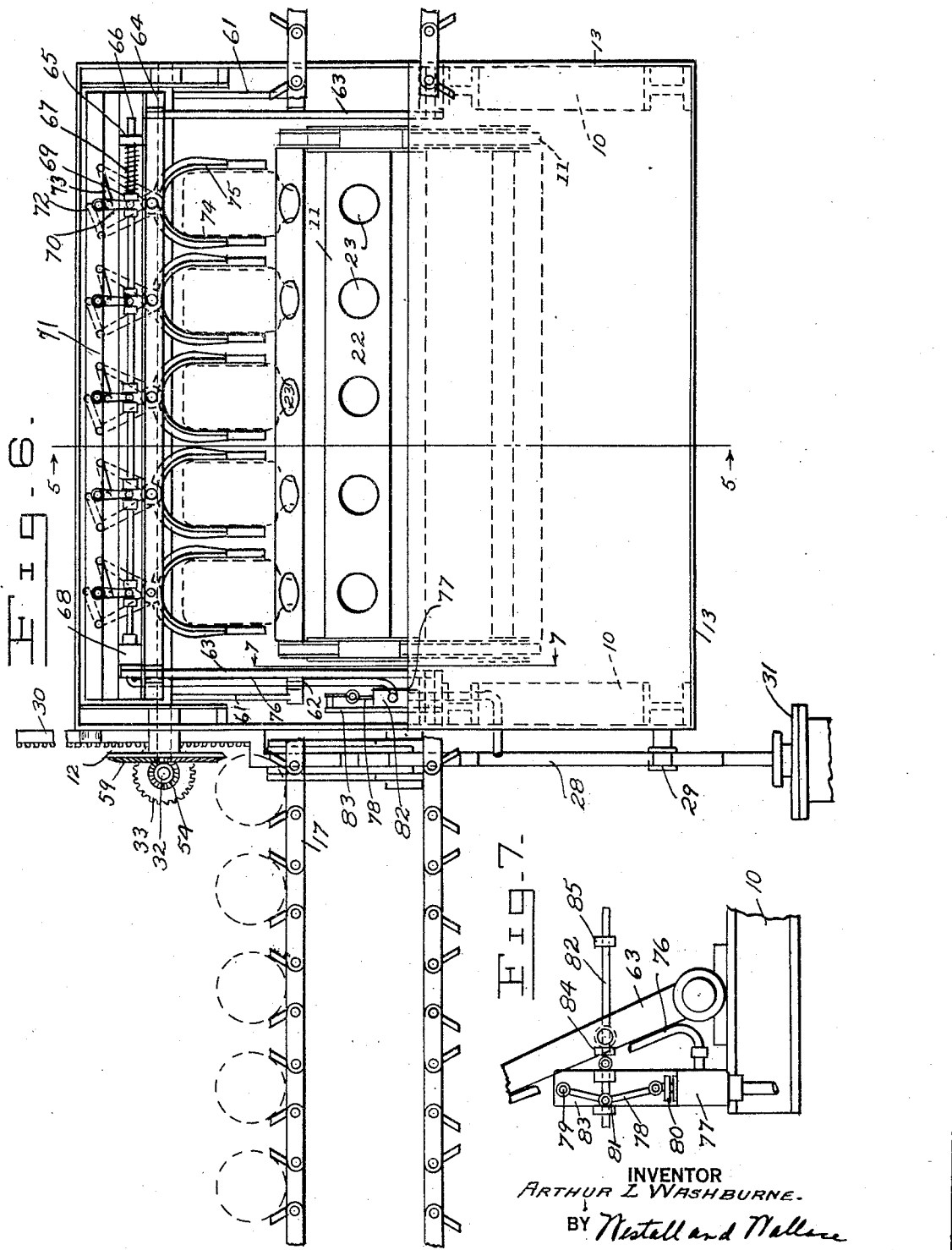

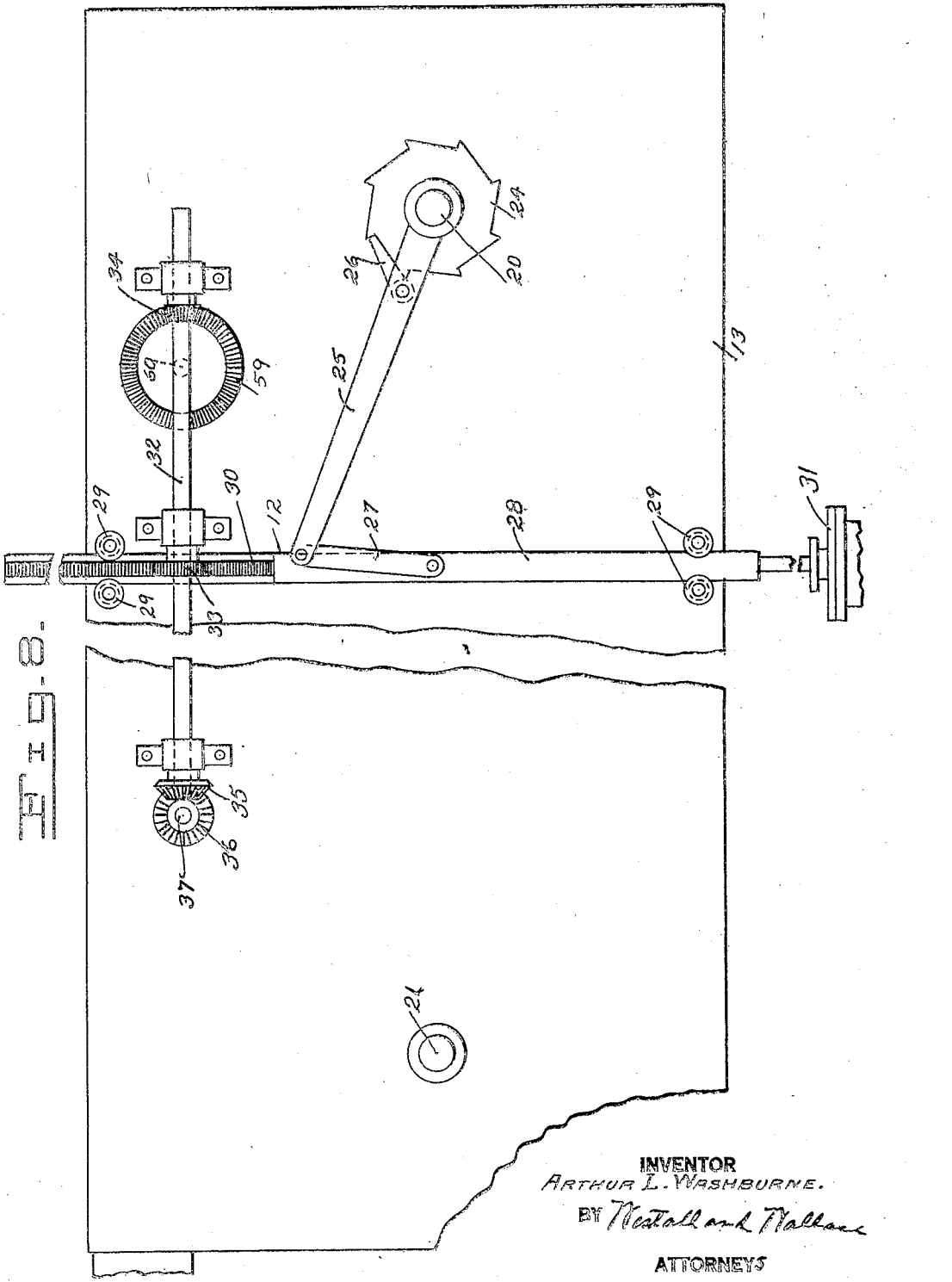

Patented Sept. 6, 1932

1,875,532

UNITED STATES PATENT OFFICE

ARTHUR L. WASHBURNE, OF LOS ANGELES, CALIFORNIA, ASSIGNOR TO SPARKLETTS BOTTLED WATER CORPORATION, OF LOS ANGELES, CALIFORNIA, A CORPORATION OF CALIFORNIA

BOTTLE CONVEYER AND DELIVERER

Application filed December 26, 1930. Serial No. 504,770.

This invention relates to a conveying device for transporting and automatically discharging bottles or demijohns. As described herein, the device is embodied in a bottle washing machine. An endless conveyer for bottles which are transported thereby through a bottle washer chamber is disposed intermediate an intake conveyer of bottles to be washed and a discharge conveyer for cleansed bottles. At the intake end of the endless conveyer there may be a bottle transfer mechanism for automatically moving bottles from the intake conveyer and upending them, and at the delivery end of the endless conveyer is a bottle transfer mechanism for taking bottles from the endless conveyer and transferring them to the discharge conveyer. Both transfer devices and the endless conveyer are operated in synchronism by suitable mechanism. The object of this invention is to provide a novel association of conveyer and bottle delivery mechanism conforming with the mechanism just described.

An apparatus embodying the invention, is shown in the accompanying drawings, in which:—

Fig. 1 is a side elevation of a fragment of the endless conveyer and frame thereof showing the intake end, the housing for the conveyer and the washing mechanism, the latter not being shown in detail; Fig. 2 is an end view of the intake end of the washer; Fig. 3 is a detail end view on an enlarged scale of a fragment of the bottle upender; Fig. 4 is a side view of a fragment of the bottle pusher mechanism; Fig. 5 is a side elevation of a fragment of the conveyer and frame thereof showing the delivery end; Fig. 6 is an end view of the structure shown in Fig. 5; Fig. 7 is a detail view of a portion of the bottle discharge control mechanism; and Fig. 8 is a side view of the washer showing details of the operating mechanism, parts being broken out to make the view more compact.

Referring more particularly to the drawings, a frame work is denoted generally by 10. This frame work supports an endless conveyer 11 and bottle pushing mechanism marked 12. The frame work is enclosed by walls forming a housing indicated in general by 13. The housing 13 is open at opposite ends and the mechanism 14 for upending bottles received from the delivery conveyer is disposed at the intake end. The delivery conveyer travels transverse to the washer conveyer 11 and is denoted by 15. At the opposite end of the housing is the bottle discharge mechanism indicated generally by 16 and taking bottles from the conveyer 11 and transferring them to a discharge conveyer marked 17. This discharge conveyer has a path of travel transverse to the washer conveyer. Bottles resting on their sides are placed on the delivery conveyer 15 and are pushed therefrom to the washer conveyer 11 and upended. After passing through the washer, the bottles are transferred by the discharge transfer mechanism 16 to the discharge conveyer 17 and laid on their sides. The washer conveyer 11 comprises sprocket wheels 18 and 19, wheels 19 being the driving wheels and fixed to a shaft 20 which is rotated by a ratchet wheel. Sprocket wheels 18 are mounted on a shaft 21. A chain conveyer disposed over sprocket wheels 18 and 19 has links with bottle carriages 22 extending between and secured to the links. These carriages have openings 23 to receive the necks of the bottles, as shown in Fig. 6.

Referring to Fig. 8 the drive shaft 20 has secured thereto at one end a ratchet wheel 24. Pivotally mounted on shaft 20 is a pawl arm 25 having a detent 26 for engagement with the ratchet wheel 24. Pawl arm 25 has pivotally secured to the end thereof a connecting link 27 which is secured at its other end to a reciprocable rod 28 guided between rollers 29. The upper end of the reciprocable rod 28 is offset to provide a rack 30. A reciprocable fluid pressure motor cylinder 31 has a plunger secured to rod 28 whereby to reciprocate the latter and thereby intermittently turn shaft 20. Journalled upon the housing 13 is a shaft 32 carrying a gear 33 so that reciprocation of the rod 28 causes oscillation of the gear 33 and shaft 32. Upon shaft 32 is a bevel pinion 34. At the opposite end of shaft 32 is a bevel pinion 35. Bevel pinion 35 meshes with a bevel gear 36 secured to a shaft 37. Thus, reciprocation of the rod 28 will cause oscillation of shaft 37. Adjacent the ends of shaft 37 are gears 38 fixed thereto, each meshing with a pair of reciprocable racks 39 and 40, one rack upon each side of each gear so that the racks are caused to travel in opposite directions. There are a pair of racks at each side of the housing. These racks are guided by a frame 41 having guide rollers 42. The outer end of rack rod 39 has pivoted thereto an extension 43 with a roller 44 thereon guided in grooved track 45. At the end of the pivoted extension 43 is a roller 46 riding in track 45. Track 45 has an offset 47 forming a turn-out and a switch 48 is pivoted thereon, so that the roller 46 when disposed to the right or inwardly of the switch, will on its outward travel move upwardly into the turn-out 47 and on its return, will lift the switch 48 returning on the main track 45. At the outer end of the turn-out is a pivoted switch 49 having a counter weight 50 tending to hold the switch in closed position as shown in Fig. 1. Roller 46 will on its outward travel pass by switch 49 into the main track 45 for return. Mounted upon and depending from a cross bar connecting extensions 43 adjacent their outer ends are pushers 51 for engaging bottles and moving them inwardly towards the upending mechanism. Oscillation of the gears 38 causes rack rods 39 to be moved so that on their inward travel, pushers 51 will engage bottles as shown in Fig. 1 and move the latter inwardly to the upender. The return movement is such that the outer ends of the extensions are lifted by reason of the rollers 46 riding upwardly over switches 48 into the turn-outs 47 and thence passing downwardly by the switches 49 into the main tracks 45 so that they are positioned as shown in Fig. 1. The positions of the extensions 43 and the pushers 51 on their return are as shown in Fig. 4. The turn-outs are such that the pushers are lifted over the bottles, a bottle being shown in dotted lines in Fig. 1.

Rack rod 40 is caused to travel in the opposite direction and has pivotally attached thereto a connecting rod 52 which is attached at its outer end by a pivot pin to a bracket forming a part of levers 53, the latter being pivoted on shaft 21. Leaf spring arms 54 are secured to levers 53 and extend downwardly along the sides of chutes formed in sections as indicated by 55a and 55b. A bottle shown in dotted lines in Fig. 1 will be pushed by a pusher 51 across chute section 55a and into chute section 55b. The arms 54 will be moved downwardly when the bottles have arrived with their necks in openings 23 of a conveyer carriage. On the arms 54 are pivoted fingers 56 which are stopped in the position shown in Fig. 3 and may be raised against the action of leaf springs 57. Thus, the arms can be moved downwardly, the fingers 56 being retracted against the action of springs 57 so that the fingers can clear the sides of the bottles. Thereupon the fingers extend to the position shown in Fig. 3 and swinging upwardly of the lever arms 53 in synchronism with the travel of the conveyer 11 will cause bottles to follow the conveyer and to be lifted to upright position. Guide bars 86 are mounted on the frame in registration with the arms 54 so that arms 54 will as they approach the end of their upward swing be engaged by the guide bars and sprung upwardly to clear the bottles and be released therefrom. Thereupon the arms are in position to be turned for the next set of bottles. The parts are so designed, that on oscillation of the shaft 37 in one direction, the bottles will be pushed from the delivery conveyer by the pushers 51, the upending mechanism will then extend over the bottles and as the pushers stop will then upend the bottles with movement of the conveyer.

Referring to Figs. 5, 6, 7, and 8, a bevel gear 59 meshes with bevel pinion 34 so that shaft 32 oscillates bevel pinion 59. A shaft 60 on which bevel gear 59 is fixed has fixed thereto crank arms 61. Connected pivotally to crank arms 61 are connecting links 62 secured to levers 63. The outer ends of levers 63 are pivoted on the frame as shown in Figs. 5 and 7. The upper ends of levers 63 have an outward inclination as indicated by 63a.

At the tops of arms 63 is a cross member 64 carrying a slide bearing 65 for a slide rod 66. A compression spring 67 tends to maintain the slide rod 66 in the left-hand position shown in Fig. 6. A reciprocating motor 68 has a plunger therein which is attached to rod 66 and is arranged so that fluid pressure acting against the plunger will move slide rod 66 to the right against the action of compression spring 67. Slide boxes indicated generally by 69 are provided on slide rod 66 and receive the ends of lever arms 70, the upper end of each lever arm being pivoted on a cross plate 71. The lever arms 70 are pivoted intermediate their ends, and connected to the upper end of each is a connecting link 72 while below is a connecting link 73. The arrangement is such that upon swinging arms 70 the connecting links are moved to and from each other. These connecting links are secured to the arms of grasping tongs having jaws 74 and 75 adapted to embrace a bottle, there being engaging enlargements at the ends of the jaws. The cylinder 68 has secured to one end thereof a tube 76 which is flexible and swings with the arms 63. A reciprocable valve 77 which controls the flow of fluid under pressure to cylinder 68 is disposed on the framework 10 and is operated by a buckling link 78, mounted in a stationary position at its upper end 79 and having its lower end secured to the operating portion of the valve 77, which operating portion is marked 80 in Fig. 7. The knuckle of the buckling member is secured as indicated by 81 to a rod 82 guided in slide bearings on standard 83. Knuckle 81 when it engages the outer bearing will be straightened so as to depress the valve member 80, and will be then on center so that it will remain in this position until positively moved in the other direction. Tappets 84 and 85 are secured to the rod 82 so that in the inner position, the rod 82 will be engaged by arm 63 and can be moved with the buckling link to the position shown in Fig. 7. In the outer position of arms 63, tappet 85 will be engaged and rod 82 will be moved to position the buckling member in line.

In the operation of the machine, conveyer 15 carrying bottles to be washed is operated to position a group of bottles at the intake end of the machine, one bottle for each upender. The conveyer is halted and fluid under pressure admitted to motor 31. This causes rod rack 28 to be elevated and shaft 32 to be oscillated. At the intake end pushers 51 are initially in position to pass bottles along the chute sections 55a and 55b. Rod 39 travels inwardly, while the upender bottle clasping arms descend and the main conveyer travels to position an unoccupied carriage in front of the necks of incoming bottles. When the bottles are disposed in the carriages, the upender clasping arms start upward travel with the newly charged carriage and the pushers are returned. The conveyer 15 is moved to position a new set of bottles for upending. While the operation described is taking place at the intake end, the following steps are progressing at the discharge end. Initially the parts are in the position shown in Figs. 5 and 6. The tong arms 74 embrace bottles on a carriage of conveyer 11. The tong assembly is swung by arms 63 outward to dispose the bottles on discharge conveyer 17. At the end of the movement, tappet rod 82 is moved to straighten buckling link 78 and open the valve 77 to admit pressure fluid to motor 68, thereby opening the tong jaws and releasing the bottles. The tong assembly returns to a position with the jaws ready to grasp other bottles on the succeeding carriage which has arrived. The discharge conveyer is moved to position empty spaces for receiving another set of bottles. Obviously the intermittent progress of the delivery and discharge conveyers may be timed to operate with the main conveyer and its associated parts by interconnecting mechanism.

What I claim is:—

1. In a bottle handling machine, an endless conveyer to transport bottles to a discharge end: mechanism to intermittently advance said conveyer step by step including a reciprocable operating member and intermittent advancing means for said conveyer operated by one way movement of said member, and a bottle grasping device at the discharge end including oscillatable lever arms mounted to be swung over said conveyer and geared to said member to be oscillated simultaneously with said member through a cycle, tongs supported by said arms for grasping bottles, motor means connectioned to said tongs for swinging the jaws thereof to bottle release position, control means for said motor having a tappet rod actuated by said lever arms at the outer end of their oscillation to cause said motor to move the tong jaws to bottle release position and at the inner end of their oscillation operating said valve control means to enable said tong jaws to be closed to bottle clasping position, and means urging said tong jaws to clasping position.

2. In a bottle handling machine, an endless conveyer to transport bottles to a discharge end: mechanism to intermittently advance said conveyer step by step including a reciprocable operating member and intermittent advancing means for said conveyer operated by one-way movement of said member; and a bottle grasping device at the discharge end including oscillatable lever arms mounted to be swung over said conveyer and geared to said member to be oscillated simultaneously with said member through a cycle, tongs supported by said arms for grasping bottles, fluid motor actuated means connected to said tongs for swinging the jaws thereof to bottle release position, valve control means for said fluid motor actuated means having a tappet rod actuated by said lever arms at the outer end of their oscillation to supply actuating fluid to said motor and cause movement of the tong jaws to bottle release position and at the inner end of their oscillation operating said valve control means to enable said tong jaws to close to bottle clasping position, and means urging said tong jaws to clasping position.

3. In a bottle handling machine, an endless conveyer to transport bottles to a discharge end: mechanism to intermittently advance said conveyer step by step including a reciprocable operating member and intermittent advancing means for said conveyer operated by one-way movement of said member; and a bottle grasping device at the discharge end including oscillatable lever arms mounted to be swung over said conveyer and geared to said member to be oscillated simultaneously with said member through a cycle, a cross bar supported by and between said arms, tongs pivotally supported on said bar for grasping bottles, a fluid motor having a piston rod projectible by admission of actuating fluid to said motor, resilient means urging said rod to retracted position, tong linkage connecting said rod to the arms of said tongs whereby to open the tongs on projection of said rod and to close the tongs on retraction, valve control means for said fluid motor having a tappet rod actuated by said lever arms at the outer end of their oscillation to supply actuating fluid to said motor and project said rod and at the inner end of their oscillation operating said valve control means to enable retraction of said rod by said resilient means.

4. In a bottle handling machine, an endless conveyer to transport bottles to a discharge end: mechanism to intermittently advance said conveyer step by step including a reciprocable rack, a pawl and ratchet for advancing said conveyor step by step, gearing connecting said rack and pawl to oscillate the latter with reciprocation of said rack; and a bottle grasping device at the discharge end including oscillatable lever arms mounted to be swung over said conveyer and geared to said rack to be oscillated simultaneously therewith through a cycle, tongs supported by said arms for grasping bottles, fluid motor actuated means connected to said tongs for swinging the jaws thereof to bottle release position, valve control means for said fluid motor actuated means having a tappet rod actuated by said lever arms at the outer end of their oscillation to supply actuating fluid to said motor and cause movement of the tong jaws to bottle release position and at the inner end of their oscillation operating said valve control means to enable said tong jaws to close to bottle clasping position, and means urging said tong jaws to clasping position.

5. In a bottle handling machine, an endless conveyer to transport bottles to a discharge end: mechanism to intermittently advance said conveyer step by step including a reciprocable rack, a pawl and ratchet for advancing said conveyer step by step, gearing connecting said rack and pawl to oscillate the latter with reciprocation of said rack; and a bottle grasping device at the discharge end including oscillatable lever arms mounted to be swung over said conveyer and geared to said rack to be oscillated simultaneously with said rack through a cycle, a cross bar supported by and between said arms, tongs supported on said bar for grasping bottles, a fluid motor having a piston rod projectible by admission of actuating fluid to said motor, resilient means urging said rod to retracted position, tong linkage connecting said rod to the arms of said tongs whereby to open the tongs on projection of said rod and to close the arms on retraction, valve control means for said fluid motor having a tappet rod actuated by said lever arms at the outer end of their oscillation to supply actuating fluid to said motor and project said rod and at the inner end of their oscillation operating said valve control means to enable retraction of said rod by said resilient means.

In witness that I claim the foregoing I have hereunto subscribed my name this 12th day of December, 1930.

ARTHUR L. WASHBURNE.